(12) United States Patent
Montgomery et al.

(10) Patent No.: US 8,290,152 B2
(45) Date of Patent: Oct. 16, 2012

(54) MANAGEMENT SYSTEM FOR WEB SERVICE DEVELOPER KEYS

(75) Inventors: John I. Montgomery, Seattle, WA (US); Adam D. Nathan, Redmond, WA (US); Timothy Rice, Bellevue, WA (US); Andrew Sterland, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 11/897,381

(22) Filed: Aug. 30, 2007

(65) Prior Publication Data
US 2009/0060178 A1  Mar. 5, 2009

(51) Int. Cl.
H04L 9/00 (2006.01)
H04L 9/08 (2006.01)
H04L 29/06 (2006.01)
H04L 9/32 (2006.01)
G06F 7/04 (2006.01)
G06F 15/16 (2006.01)
G06F 17/30 (2006.01)
G06F 11/30 (2006.01)
G06F 12/14 (2006.01)

(52) U.S. Cl. ............ 380/44; 380/281; 380/284; 726/4; 726/6; 713/171; 713/189

(58) Field of Classification Search ............ 380/44, 380/281, 284, 278
See application file for complete search history.

(56) References Cited

U.S. PATENT DOCUMENTS

| | | | |
|---|---|---|---|
| 5,146,498 A * | 9/1992 | Smith | 380/273 |
| 5,517,567 A * | 5/1996 | Epstein | 380/247 |
| 6,199,077 B1 * | 3/2001 | Inala et al. | 715/201 |
| 6,345,256 B1 * | 2/2002 | Milsted et al. | 705/64 |
| 6,445,797 B1 * | 9/2002 | McGough | 380/285 |
| 6,978,376 B2 * | 12/2005 | Giroux et al. | 713/189 |
| 7,024,552 B1 | 4/2006 | Caswell et al. | |
| 7,055,143 B2 * | 5/2006 | Ringseth et al. | 717/143 |
| 7,137,006 B1 | 11/2006 | Grandcolas et al. | |
| 7,251,635 B2 * | 7/2007 | Lam et al. | 705/79 |
| 7,260,224 B1 * | 8/2007 | Ingle et al. | 380/279 |
| 7,287,271 B1 * | 10/2007 | Riggins | 726/3 |
| 7,305,548 B2 * | 12/2007 | Pierce et al. | 713/155 |
| 7,324,648 B1 * | 1/2008 | Deaver et al. | 380/278 |
| 7,475,247 B2 * | 1/2009 | Bade et al. | 713/169 |
| 7,493,487 B2 * | 2/2009 | Phillips et al. | 713/168 |
| 7,529,793 B2 * | 5/2009 | Itoh et al. | 709/203 |
| 7,581,243 B2 * | 8/2009 | Shigeeda | 726/3 |
| 7,594,116 B2 * | 9/2009 | Bruns et al. | 713/171 |
| 7,603,322 B2 * | 10/2009 | Lam et al. | 705/71 |
| 7,603,703 B2 * | 10/2009 | Craft et al. | 726/22 |

(Continued)

OTHER PUBLICATIONS

"Web Services Security: What's Required to Secure a Service-Oriented Architecture", Date; Oct. 2006.

(Continued)

*Primary Examiner* — Carolyn B Kosowski

(57) ABSTRACT

Various technologies and techniques are disclosed for managing web service developer keys. A generic key identifier can be generated based on an original web service key. The generic key identifier is used within source code of an application being developed. Upon receiving a request to run the application, the generic key identifier is transformed back into the original web service key prior to calling an associated web service. Multiple users can securely share the same application that uses the web service. When one user who does not have his own original web service key accesses the application, that user can be prompted to obtain and enter the original web service key once the key has been obtained from a provider of the web service.

11 Claims, 13 Drawing Sheets

U.S. PATENT DOCUMENTS

| | | | | |
|---|---|---|---|---|
| 7,693,285 B2 * | 4/2010 | Curry | | 380/281 |
| 7,698,398 B1 * | 4/2010 | Lai | | 709/223 |
| 7,702,107 B1 * | 4/2010 | Messing | | 380/259 |
| 7,711,843 B2 * | 5/2010 | Breiter et al. | | 709/237 |
| 7,721,114 B2 * | 5/2010 | Yamaguchi et al. | | 713/189 |
| 7,774,450 B2 * | 8/2010 | Imamura et al. | | 709/223 |
| 8,069,435 B1 * | 11/2011 | Lai | | 717/106 |
| 2003/0115341 A1 | 6/2003 | Sinha et al. | | |
| 2003/0204738 A1 * | 10/2003 | Morgan | | 713/194 |
| 2005/0081039 A1 * | 4/2005 | Lee et al. | | 713/176 |
| 2005/0132222 A1 | 6/2005 | Petrovic | | |
| 2005/0144457 A1 * | 6/2005 | Lee et al. | | 713/176 |
| 2006/0004771 A1 * | 1/2006 | Enenkiel | | 707/10 |
| 2006/0041669 A1 | 2/2006 | Bemmel et al. | | |
| 2006/0080546 A1 | 4/2006 | Brannon et al. | | |
| 2006/0126848 A1 * | 6/2006 | Park et al. | | 380/277 |
| 2006/0206932 A1 | 9/2006 | Chong | | |
| 2006/0212706 A1 * | 9/2006 | Jiang et al. | | 713/176 |
| 2006/0282897 A1 | 12/2006 | Sima et al. | | |
| 2007/0067479 A1 | 3/2007 | Angelov | | |
| 2007/0169015 A1 * | 7/2007 | Seelig et al. | | 717/136 |
| 2007/0239859 A1 * | 10/2007 | Wilkinson et al. | | 709/220 |
| 2007/0276948 A1 * | 11/2007 | Burdett et al. | | 709/228 |
| 2007/0283423 A1 * | 12/2007 | Bradley et al. | | 726/4 |
| 2007/0294776 A1 * | 12/2007 | Ikake | | 726/30 |
| 2008/0244078 A1 * | 10/2008 | Viljoen et al. | | 709/229 |

OTHER PUBLICATIONS

Mahmoud, Qusay H., "Securing Web Services and the Java WSDP 1.5 XWS-Security Framework", Date: Mar. 2005, http://java.sun.com/developer/technicalArticles/WebServices/security/.

Singh, Irina, "XML encryption and digital signature", Date: May 30, 2006, http://www.ibm.com/developerworks/websphere/techjournal/0606_singh/0606_singh.html.

* cited by examiner

290

```
┌─────────────────────────────────────────────────────────┐
│ DEVELOPER CREATES NEW APPLICATION THAT USES WEB SERVICE │
│       FOR WHICH ORIGINAL KEY IS ALREADY STORED          │
│                          292                            │
└─────────────────────────────────────────────────────────┘
                             │
                             ▼
┌─────────────────────────────────────────────────────────┐
│ WHEN DEVELOPER SAVES APPLICATION, ALL ASSOCIATED ORIGINAL│
│ KEYS ARE TRANSFORMED INTO ENCRYPTED VERSIONS IN SOURCE  │
│                         CODE                            │
│                          294                            │
└─────────────────────────────────────────────────────────┘
                             │
                             ▼
┌─────────────────────────────────────────────────────────┐
│ WHEN RUNNING APPLICATION FROM CLIENT, ENCRYPTED VERSION IS│
│         PASSED TO THE BACKEND SERVER                    │
│                          296                            │
└─────────────────────────────────────────────────────────┘
                             │
                             ▼
┌─────────────────────────────────────────────────────────┐
│ BACKEND SERVER DECRYPTS THE ENCRYPTED VERSION BACK INTO │
│      ORIGINAL KEY FOR ROUTING TO WEB SERVICE            │
│                          298                            │
└─────────────────────────────────────────────────────────┘
                             │
                             ▼
┌─────────────────────────────────────────────────────────┐
│ SYSTEM ENSURES THAT ORIGINAL KEY IS ONLY SENT TO INTENDED│
│                        SERVER                           │
│                          300                            │
└─────────────────────────────────────────────────────────┘
                             │
                             ▼
┌─────────────────────────────────────────────────────────┐
│ BACKEND SERVER MAKES WEB SERVICE CALL(S) AND RETURNS    │
│                   RESULTS TO CLIENT                     │
│                          302                            │
└─────────────────────────────────────────────────────────┘
```

```
┌─────────────────────────────────────────────────────────────┐
│ DEVELOPER CREATES NEW APPLICATION THAT USES WEB SERVICE     │
│         FOR WHICH ORIGINAL KEY IS ALREADY STORED            │
│                          322                                │
└─────────────────────────────────────────────────────────────┘
                              │
                              ▼
┌─────────────────────────────────────────────────────────────┐
│  WHEN DEVELOPER SAVES APPLICATION KEY IDS ARE STORED IN     │
│                      SOURCE CODE                            │
│                          324                                │
└─────────────────────────────────────────────────────────────┘
                              │
                              ▼
┌─────────────────────────────────────────────────────────────┐
│ WHEN DEVELOPER RUNS APPLICATION FROM CLIENT, SYSTEM SCANS   │
│                 FOR KEY IDS IN SOURCE CODE                  │
│                          326                                │
└─────────────────────────────────────────────────────────────┘
                              │
                              ▼
┌─────────────────────────────────────────────────────────────┐
│ FOR EACH KEY ID, BACKEND SERVER FETCHES ORIGINAL KEY FROM   │
│                      SECURE STORAGE                         │
│                          328                                │
└─────────────────────────────────────────────────────────────┘
                              │
                              ▼
┌─────────────────────────────────────────────────────────────┐
│ SERVER REPLACES KEY IDS WITH ORIGINAL KEY VALUE IN REQUEST  │
│                   THAT GOES TO WEB SERVICE                  │
│                          330                                │
└─────────────────────────────────────────────────────────────┘
                              │
                              ▼
┌─────────────────────────────────────────────────────────────┐
│  SYSTEM ENSURES THAT ORIGINAL KEY IS ONLY SENT TO INTENDED  │
│                          SERVER                             │
│                          332                                │
└─────────────────────────────────────────────────────────────┘
                              │
                              ▼
┌─────────────────────────────────────────────────────────────┐
│  BACKEND SERVER MAKES WEB SERVICE CALL(S) AND RETURNS       │
│                     RESULTS TO CLIENT                       │
│                          334                                │
└─────────────────────────────────────────────────────────────┘
```

FIG. 6

```xml
<?xml version="1.0"?>
<block class="somewebserviceClass">
<providerName>somewebservice</providerName>
<providerUrl>http://www.somewebservice.com/</providerUrl>
<providerLogoUrl>/content/components/icons/somewebservicelogo.png</providerLogoUrl>
<blockIconUrl>/conent/components/icons/somewebservice.png</blockIconUrl>
<description>somewebservice (www.somewebservice.com) . Find pictures and tags.</description>
<keys>
<description/>
<signUpUrl>http://www.somewebservice.com/services/api/keys/apply/</signUpUrl>
<key id="APIKey" whenrequired="save">
<name> API Key</name>
<notes/>
</key>
</keys>
<operations>
<operation name="getRandomPhotos" callMode="auto">
<description>Get random set of photos </description>
<inputs>
<input name="text" required="true" type="string">
<description>text in title, description, or tags</description>
```

FIG. 11

MANAGEMENT SYSTEM FOR WEB SERVICE DEVELOPER KEYS

BACKGROUND

In today's connected world, many software applications are designed to be run in a web browser over the Internet. Technology has enabled people and computers all over the world to be more connected than ever before. Consumer demand is high for Internet-based software applications that provide the information, products, and services that the consumer wants, and fast. It is therefore becoming more and more common for one particular web application to provide functionality based upon data that originated from one or more external sources, such as content from a search engine or maps from a map service, and so on. One technique that is widely used to allow companies to connect their data and other software features is through use of what are called "web services".

In the most generic sense, a "web service" is merely a function or procedure that can be called over the Internet. Web services are generally platform-neutral, meaning that they can be called from any platform capable of communicating using standard Internet protocols.

Companies such as MICROSOFT®, Google, Amazon.com, eBay, and thousands of other companies have created web services to allow developers to utilize certain data and/or features offered by these companies from within custom applications created by the developer. Many web services require a developer to obtain a developer "web service key" that must be included in each call to a particular web service. Web service keys are most commonly formed as alphanumeric keys, but other formats are sometimes used. By requiring the use of web service keys, vendors can control how much the developer can use (and thus not abuse) the service and/or how much they should charge the developer. Many web API's have a free limited use license or trial period, and some of them require payment for the service. This is another reason that the developer web service key is usually required.

SUMMARY

Various technologies and techniques are disclosed for managing web service developer keys. A generic key identifier can be generated based on an original web service key. The generic key identifier, such as an encrypted version of the original web service key, is used within source code of an application being developed. The original web service key can be stored in a secure storage device and accessed when necessary. In one implementation, upon saving the application, all original web service keys are replaced with the generic key identifier. This generic key identifier can be an encrypted version of the original web service key, or a textual identifier for the original web service key.

Upon receiving a request to run the application, the generic key identifier is transformed back into the original web service key prior to calling an associated web service. In one implementation, the generic key identifier is decrypted back into the original web service key. In another implementation, the secure storage device is accessed to retrieve the original web service key based on the generic key identifier.

Multiple users can securely share the same application that uses the same web service. When one user accesses the application that was previously created by the other user, a determination can be made that this user does not have his own original web service key that is required before access will be allowed to the web service. This user is prompted to obtain and enter the original web service key once the key has been obtained from a provider of the web service.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is a process flow diagram for one implementation illustrating the stages involved in creating encrypted versions of original web service keys on application save and then using the encrypted version until just before the web service calls when running the application.

FIG. 6 is a process flow diagram for one implementation illustrating the stages involved in retrieving original web service keys from secure storage when running the application.

FIG. 11 is exemplary source code for a manifest containing web service details.

DETAILED DESCRIPTION

The technologies and techniques herein may be described in the general context as an application that manages web service keys, but the technologies and techniques also serve other purposes in addition to these. In one implementation, one or more of the techniques described herein can be implemented as features within software development environments such as MICROSOFT® Popfly, MICROSOFT® VISUAL STUDIO®, or from any other type of program or service that allows for creation and/or sharing of software that utilizes web services.

The following example is illustrative of the concept of web services and a web service key. Suppose one web service offered by a company is called "GetPicture", and it can be accessed at the URL:

www.somewebservice.com/?Service=GetPicture

In this simplest example, without additional information in this URL, the web service is incapable of identifying the caller of the GetPicture method. Thus, web services typically require that the web service key that is unique to the developer or other user be included in the URL (or other request format). Here is an example of a URL with a developer web service key included:

http://www.somewebservice.com/?Service=GetPicture&
AccountId=abcdefghijklmnopqrstuvwxyz In the above example, the AccountId parameter included in the URL specifies the unique key that was assigned to the requesting user. There are other ways of invoking web services than the URL approach discussed here, but the point is that many web services require a web service key.

As noted previously, many of the web service keys are provided in an alphanumeric format. The typical professional web developer knows how to keep his own web service key hidden from others so as not to breach the security and integrity of his web service account by giving others his "password" to the particular web service, so to speak. However, hobbyist developers typically do not understand more advanced programming concepts, and often create web applications from within development tools that hide a lot of the source code from the developer. Thus, it would be easy for a hobbyist developer to create a web application and make their web service key available for the world to see and use.

Even for professional software developers, issues are starting to arise with the use of web service keys in mash-up applications. Mash-up applications combine multiple different web services together in a new application—called a "mash-up". An example of a mash-up might be combining search engine results from a search web service with a map from a map web service, and then combining with pictures from a picture web service. With mash-up scenarios, there are multiple web service keys involved. This means that the developer should take extra precautions before sharing his source code or applications with other developers, and in securing his web service keys in general. This also means that the developer now has more keys to keep track of.

Figure 1:
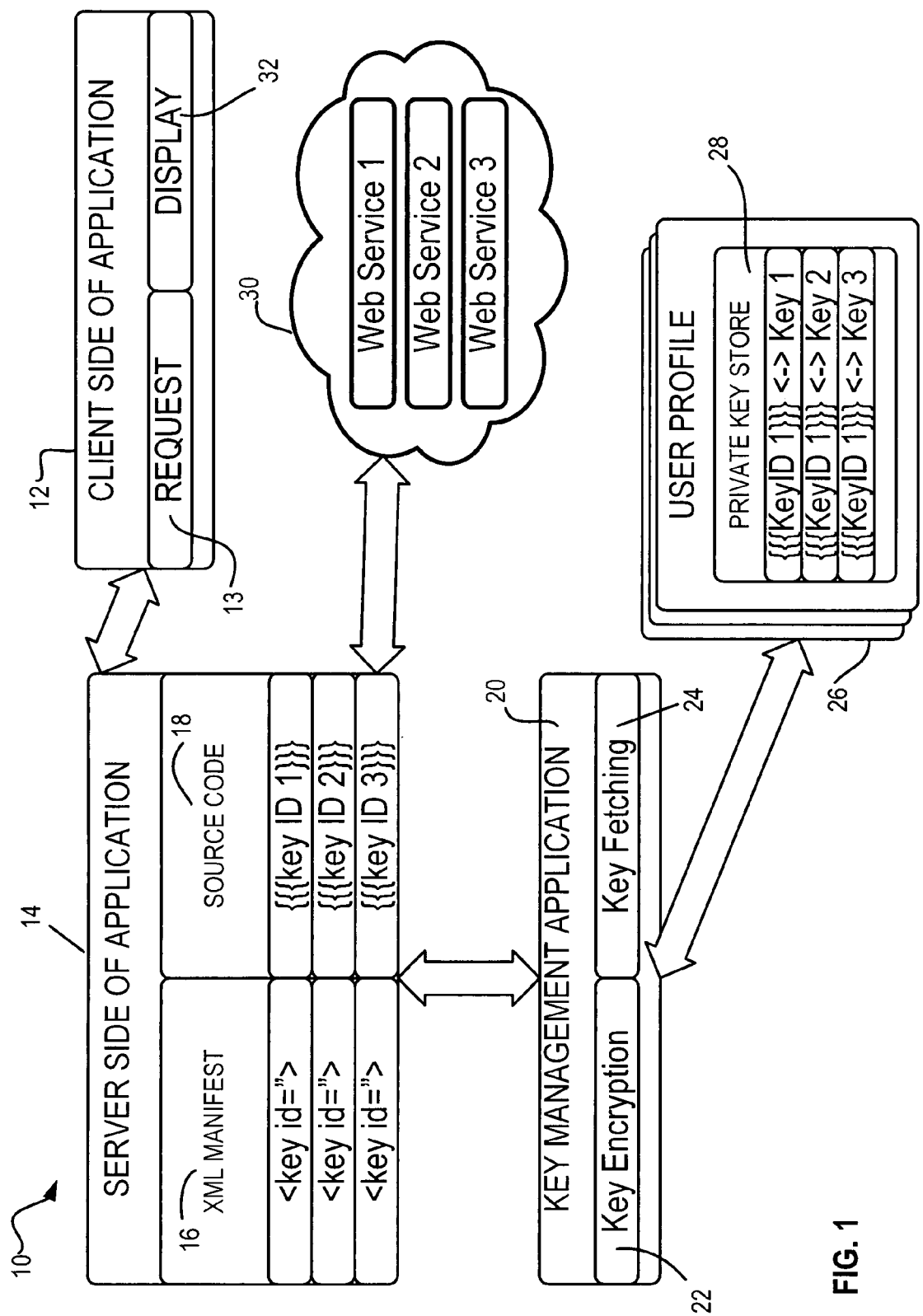
FIG. 1 is a diagrammatic view of components of a management system for web service developer keys of one implementation.

FIG. 1 illustrates various components of a management system 10 for web service developer keys of one implementation. In one implementation, management system 10 is used for storing and managing web service keys of multiple developers in a multi-user web-development environment. However, it will be appreciated that in other implementations, some or all of the techniques described herein could be used in single-user development environments, and/or in development environments that are not necessarily web-based. The term "developer" as used herein is meant to include professional developers, as well as hobbyist developers who are not professional developers, but who use tools and technologies available today to help them create software.

In one implementation, a system is provided for managing multiple web service keys. The system stores each web service key for a user in a secure, private storage. The source code does not actually contain the original web service key, but instead includes a generic key identifier that is not recognizable to users, such as a textual or encrypted version of the original web service key. Then, when the web application is executed, the web server replaces the representation of the key that is contained in the source code with the original web service key before the call is made to the web service. In this way, developers can share applications with one another that contain web service keys without revealing their private information. Furthermore, developers can more easily manage their keys to various web services.

As shown in FIG. 1, there are several components shown in the exemplary management system 10 for web service keys. First, there is a client side 12 and server side 14 to a particular web application being developed and/or executed that uses one or more web service keys. In typical browser-based web applications, the client side of the application 12 makes a request 13 to the server side 14 to run a particular application, and the server side 14 performs various operations and returns the results to the client for display 32 to an end user. The server side 14 in this context is typically one or more web servers. The terms "user" and "end user" as used herein are meant to include end users of a given application, as well as the developer or other person who is testing or otherwise running the application.

In the exemplary system 10 shown in FIG. 1, the server side 14 of the application hosts the source code 18 that contains a representation of the developer web service key(s) to be used with the one or more web services accessed by the application. This representation of the web service key contained in the source code is not the original web service key itself, but rather, can be an identifier or encrypted version of the key. The original web service key is not stored in the source code for security and other reasons. In one implementation, the server side 14 of the application also contains an XML manifest 14 which describes further details about the one or more web services. The XML manifest 14 can include details about a particular web service, such as the location of the web service, the methods offered by the web service, the parameters accepted by each method, and so on. An example of such a manifest is illustrated in further detail in FIG. 11. The server side 14 of the application then interacts with a key management application 20 to obtain the original web service key(s) that the server side 14 needs to send to the web service(s) in order to communicate.

In one implementation described in further detail in FIG. 5, an encrypted version of the key is stored in the source code. The key management application 20 is then responsible for accessing a key encryption routine 22 to generate the encrypted version that is used in the source code, and the key management application is also responsible for translating the encrypted version back into the original web service key when requested by the server side 14. In one example, this translation is performed programmatically using a translation algorithm. In another example, this translation is performed by looking up the original web service key that corresponds to the encrypted version of the original web service key, both of which can be stored in the private data store 26. In another implementation described in further detail in FIG. 6, the key management application 20 uses a key fetching routine 24 to access a private data store 26 that contains the original web service keys 28. In either case, once the original web service key(s) are retrieved, the server side of the application 14 can invoke the web service(s) 30 and then use the results received back from the web service(s) 30. For example, the results can be displayed 32 to the user on the client side 12. Key management application will be described in further detail in FIG. 2.

Figure 2:
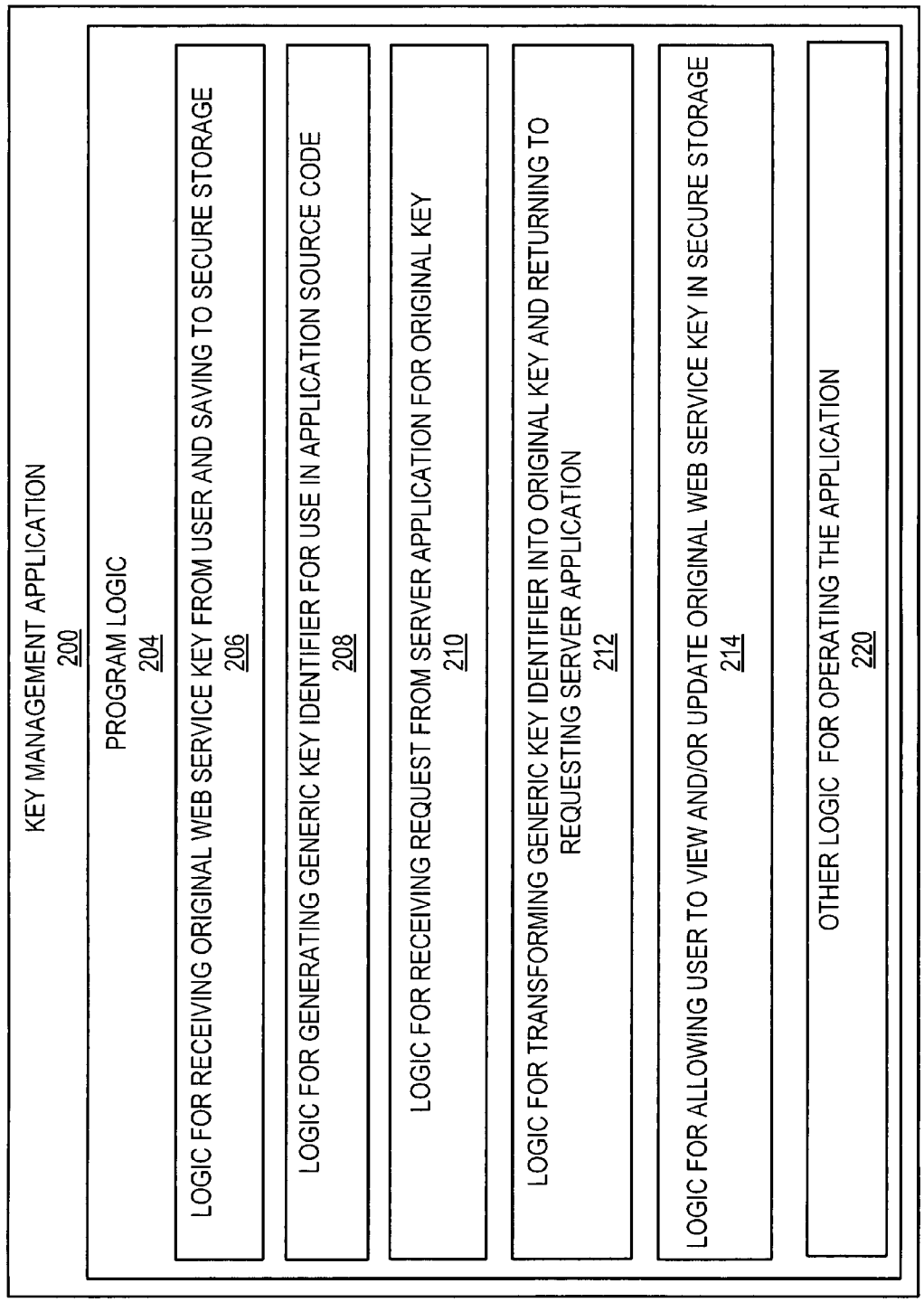
FIG. 2 is a diagrammatic view of one implementation of a key management application portrayed in FIG. 1.

Turning now to FIG. 2, a key management application 200 operating on computing device 500 (of FIG. 12) is illustrated. Key management application 200 is one of the application programs that reside on computing device 500 (of FIG. 12). However, it will be understood that key management application 200 can alternatively or additionally be embodied as computer-executable instructions on one or more computers and/or in different variations than shown on FIG. 12. Alternatively or additionally, one or more parts of key management application 200 can be part of system memory 504 (of FIG. 12), on other computers and/or applications 515 (of FIG. 12), or other such variations as would occur to one in the computer software art.

Key management application 200 includes program logic 204, which is responsible for carrying out some or all of the techniques described herein. Program logic 204 includes logic for receiving original web service key(s) from a user and saving them to secure storage 206 (as described below with respect to FIG. 4); logic for generating a generic key identifier for use in application source code 208 (as described below with respect to FIG. 5); logic for receiving request from server application for original web service key 210 (as described below with respect to FIGS. 5 and 6); logic for transforming the generic key identifier back into the original web service key and returning the original web service key to the requesting server application 212 (as described below with respect to FIGS. 5 and 6); logic for allowing user to view and/or update original web service key in secure storage 214 (as described below with respect to FIG. 8); and other logic for operating the key management application 220.

Figure 3:
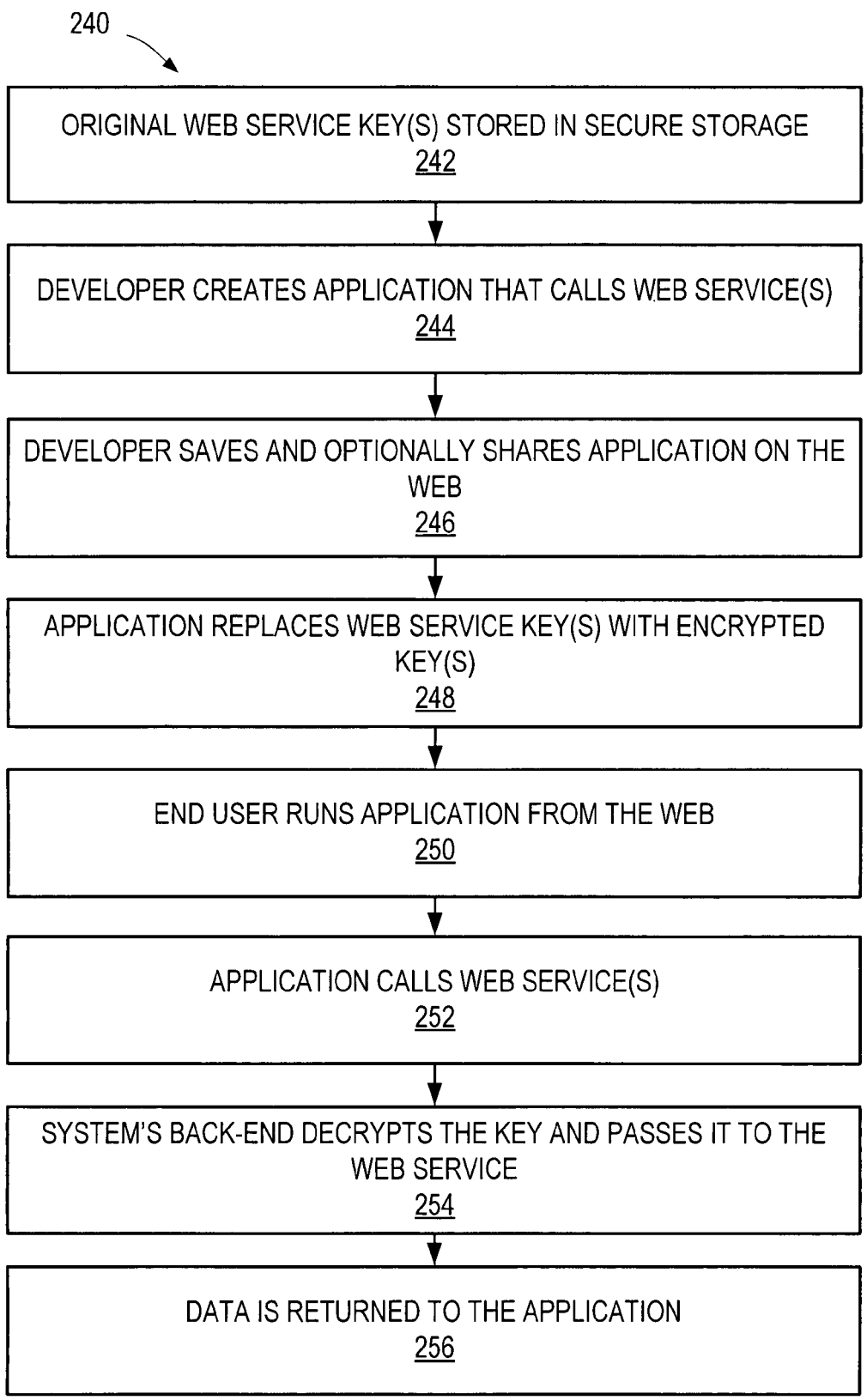
FIG. 3 is a process flow diagram for one implementation illustrating the high level stages involved in storing and using private web service keys in a multi-user development environment.

Turning now to FIGS. 3-7 with continued reference to FIGS. 1-2, the stages for implementing one or more implementations of key management application 200 are described in further detail. FIG. 3 is a high level process flow 240 of one implementation of the high level stages involved in storing and using private web service keys in a multi-user development environment. In some implementations, the processes of FIG. 3-7 are at least partially implemented in the operating logic of computing device 500 (of FIG. 12).

The original web service key(s) is/are stored in a secure storage (stage 242). This process is described in further detail in FIG. 4. A developer creates an application that calls one or more web service(s) (stage 244). The developer saves and optionally shares the application on the web (stage 246). The web service key(s) are then replaced with encrypted key(s) or another version of the key(s) (stage 248). The end user runs the application from the web (stage 250). An application containing the encrypted keys calls the web service(s) (stage 252), and the system's back-end server translates the key(s) back into the original web service key(s) and passes them to the web service (stage 254). The processes described in FIGS. 5 and 6 illustrate a few different examples of some ways that the translation process can be performed. Data is then returned to the application (stage 256), and displayed to the user on a client device as appropriate.

Figure 4:
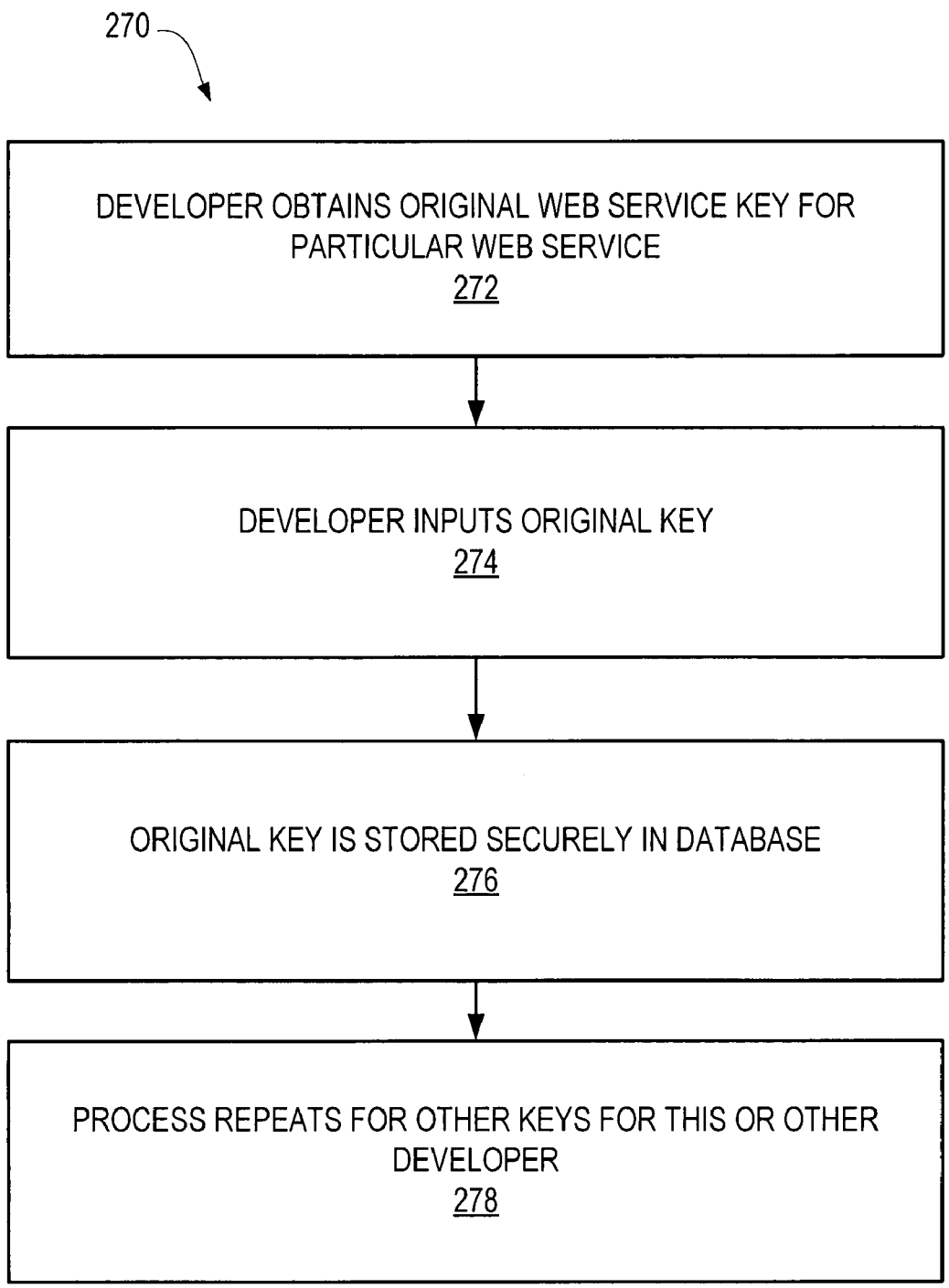
FIG. 4 is a process flow diagram for one implementation illustrating the stages involved in allowing a user to store various web service developer keys privately and securely in a multi-user development environment.

FIG. 4 is a process flow diagram 270 of one implementation that illustrates the stages involved in allowing users to store various web service developer keys privately and securely in a multi-user development environment. A developer obtains the original web service key for a particular web service (stage 272). The developer inputs the original web service key (stage 274) in a user interface, and the original web service key is stored securely in a database or other data storage device (stage 276). The process repeats for other keys for this developer or other developers (stage 278).

Turning now to FIGS. 5 and 6, a few exemplary implementations are shown for translating web service keys back to their original form. FIG. 5 is a process flow diagram 290 that illustrates one implementation of the stages involved in creating encrypted versions of the original web service keys when the application is saved, and then using the encrypted version until just before the web service calls when running the application. The developer creates a new application that uses a web service for which an original web service key is already stored (stage 292). When a developer saves an application, all associated original web service keys are transformed into encrypted versions in the source code (stage 294). In other words, a developer viewing the source code will not be able to tell what the original web service key looks like from viewing the source code. Then, when running the application from the client, the encrypted version is passed to the backend server (stage 296).

The backend server decrypts the encrypted version back into the original web service key for routing to the web service (stage 298). The decryption can be performed by calling key management application 20 as described in FIG. 1, or using other decryption techniques. In one implementation, the system ensures that a key is only sent to the intended server (stage 300). For example, tracking can be used to make sure that only the intended web service provider is sent the original web service key for the web service of that provider. This technique can be used to assure that a developer or other user is not attempting to get the key of another by routing the key to a different server. The backend server makes the web service call(s) using the original web service key(s) and returns the results of the application, including the web service call(s), to the client (stage 302).

The following is another implementation that can be used for translating the web service keys back to their original form. FIG. 6 is a process flow diagram 320 that illustrates one implementation of the stages involved in retrieving the original web service keys from secure storage when running the application. A developer creates a new application that uses one or more web services for which original web service key(s) are already stored (stage 322). When the developer saves the application, generic key identifiers are stored in the source code (stage 324). In one implementation, the generic key identifiers are user friendly names for referencing the particular web service, such as "Web Service Name". By saving the generic key identifiers in the source code instead of the name, all that a developer or other user would see when viewing the source code is the generic key identifier and not the original web service key. Then, when the developer runs the application from the client, the system scans for generic key identifiers in the source code (stage 326). For each generic key identifier, the backend server fetches the original web service key from secure storage (stage 328), such as through the key management system described in FIGS. 1 and 2, or with a direct call to the secure storage. The backend web server replaces the generic key identifiers with the original web service key(s) in the request(s) before they are transmitted to the web service(s) (stage 330). In one implementation, the system ensures that the original web service key is only sent to the intended server (stage 332). In other words, if the original web service key is designed to be used with a particular web service provided by a particular company, then the system ensures that the original web service key will only be transmitted to that intended server. The backend server makes the web service call(s) and returns the results of the application, including the web service call(s), to the client (stage 334).

Figure 7A:
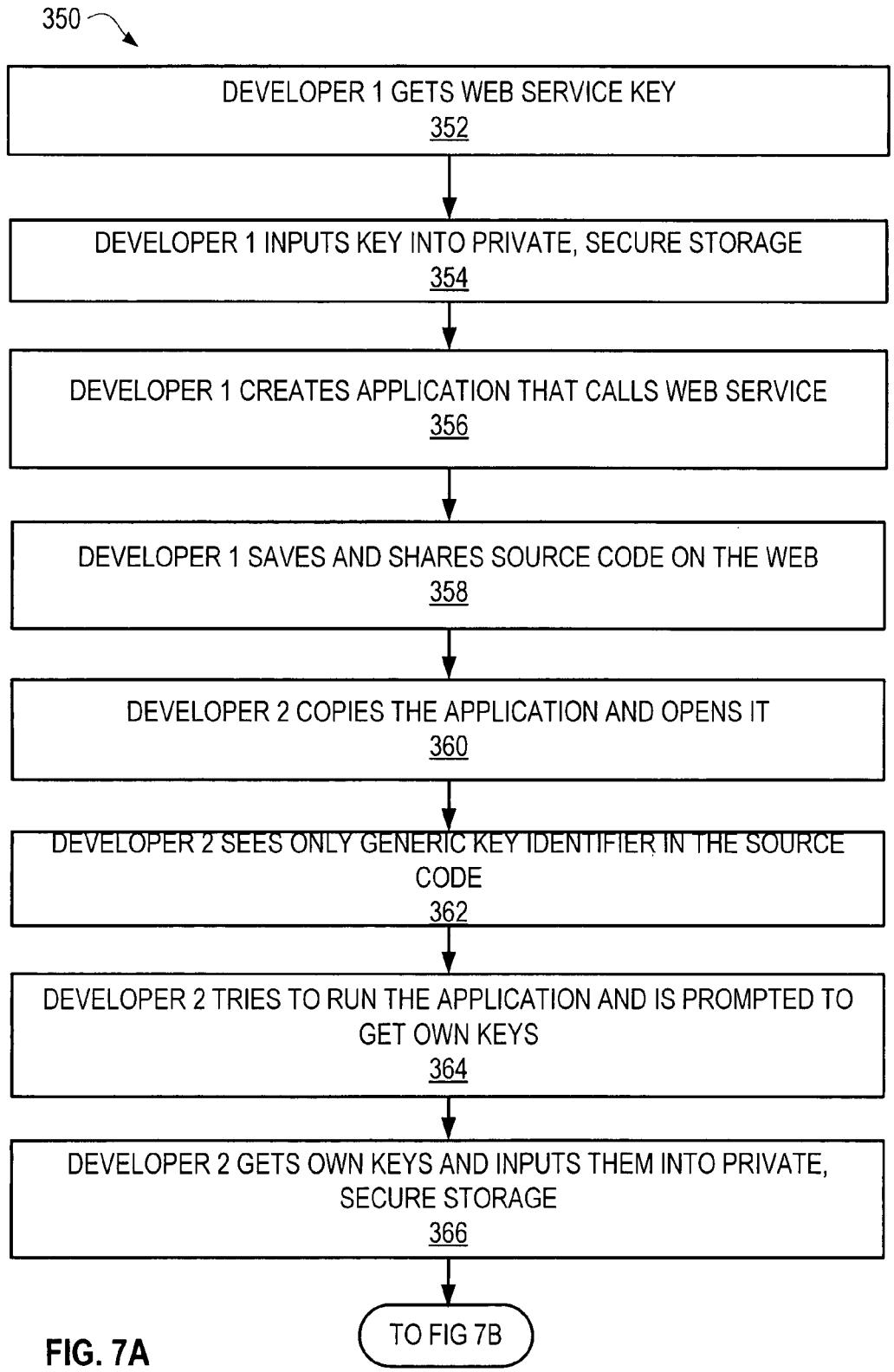
FIGS. 7A and 7B are process flow diagrams for one implementation that illustrates the stages involved in sharing an application among developers while preserving web service key privacy.
Figure 7B:
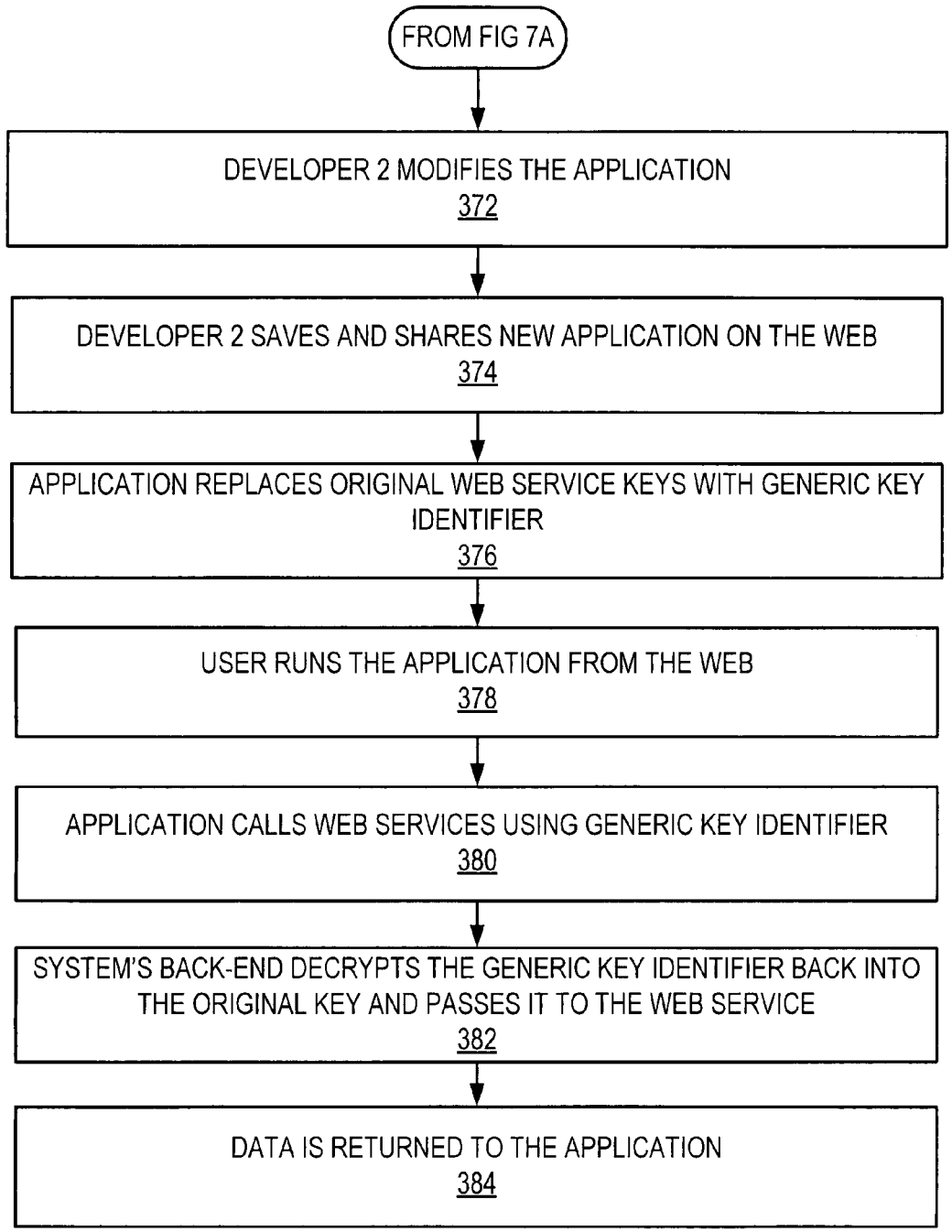

FIGS. 7A and 7B illustrate a flow diagram 350 of one implementation that illustrates the stages involved in sharing an application among developers while preserving web service key privacy. Developer 1 obtains a web service key (stage 352). Developer 1 inputs the original web service key into a user interface for storage in a private, secure storage (stage 354). An example of this is illustrated in a simulated screen shown in FIG. 8. Developer 1 then creates an application that calls the web service (stage 356). Developer 1 saves and shares the source code on the web (stage 358). The source code does not contain the original web service key, but just a generic identifier for the web service key, as described previously.

Developer 2 then copies the application and opens the application (stage 360). Developer 2 sees only the generic key identifier in the source code (stage 362). Developer 2 tries to run the application and is prompted to get his own key(s) (stage 364), such as is illustrated in the simulated screen of FIG. 9. An example of this is illustrated in a simulated screen in FIG. 10. Developer 2 gets his own key(s) and inputs them into a user interface for storage in a private, secure storage (stage 366). Continuing with FIG. 7B, developer 2 modifies the application (stage 372), and saves and shares the new application to the web (stage 374). The original web service key(s) are replaced with generic key identifier(s) in the source code (stage 376). When the developer or other user runs the application from the web (stage 378), the application initiates the web service call(s) using the generic key identifiers (stage 380). However, before the web service call(s) are actually invoked, the system's back-end web server decrypts the generic key identifier(s) back into the original web service key(s) and passes the original web service key(s) to the web service(s) (stage 382). The data is returned to the application and displayed to the developer or user on the client as appropriate (stage 384).

Turning now to FIGS. 8-11, simulated screens are shown to further illustrate some of the techniques described herein. In one implementation, these screens are displayed on display 32 of client side application 12, which is also shown as output device(s) 511 on FIG. 12. Furthermore, these screens can receive input from users from input device(s) 512 of FIG. 12.

Figure 8:
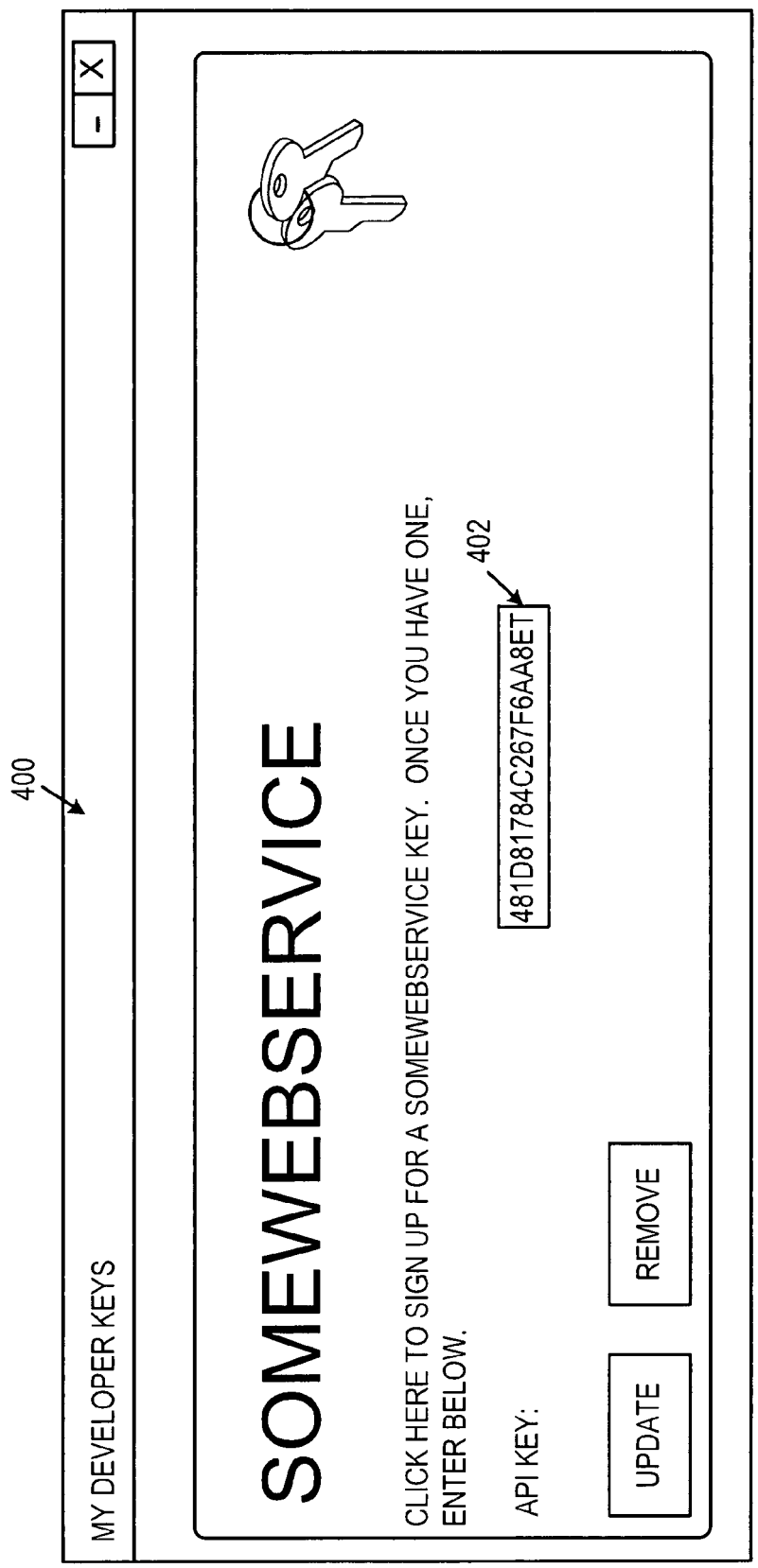
FIG. 8 is a simulated screen for one implementation that illustrates an original web service key being entered and saved.

Starting now with FIG. 8, a simulated screen 400 is shown that illustrates an original web service key 402 being entered and saved. In the example shown, the user is simply entering a single web service key. However, in other implementations, a list of multiple web service keys can be displayed in a format that allows the user to view and/or update multiple keys from the same screen.

Figure 9:
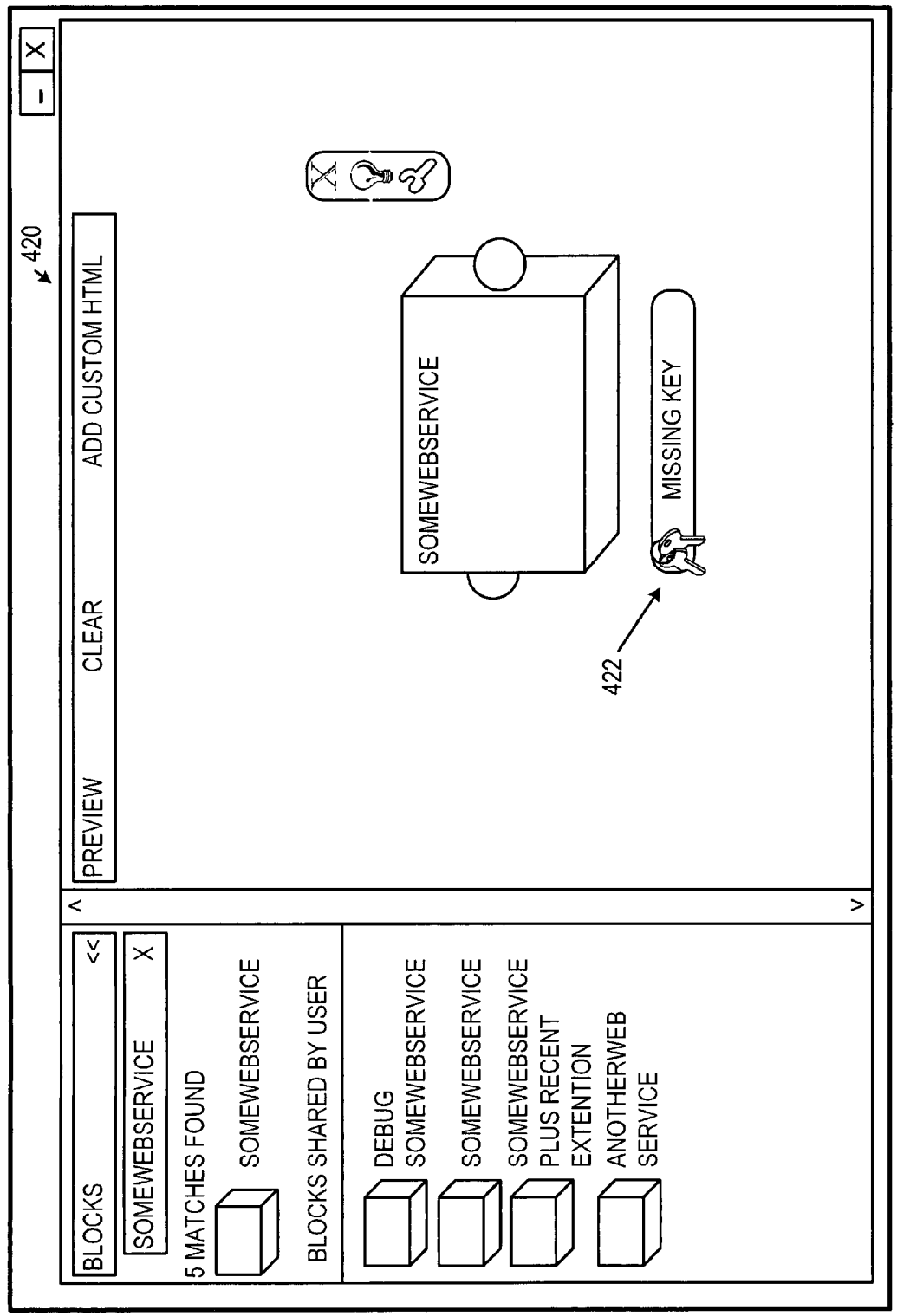
FIG. 9 is a simulated screen for one implementation that illustrates prompting a user for a web service key in a development environment.

FIG. 9 shows a simulated screen 420 of one implementation that illustrates a system notification that a web services key is missing. The notification 422 simply indicates that a particular web service is being used in the project for which a web service key is missing for that developer.

Figure 10:
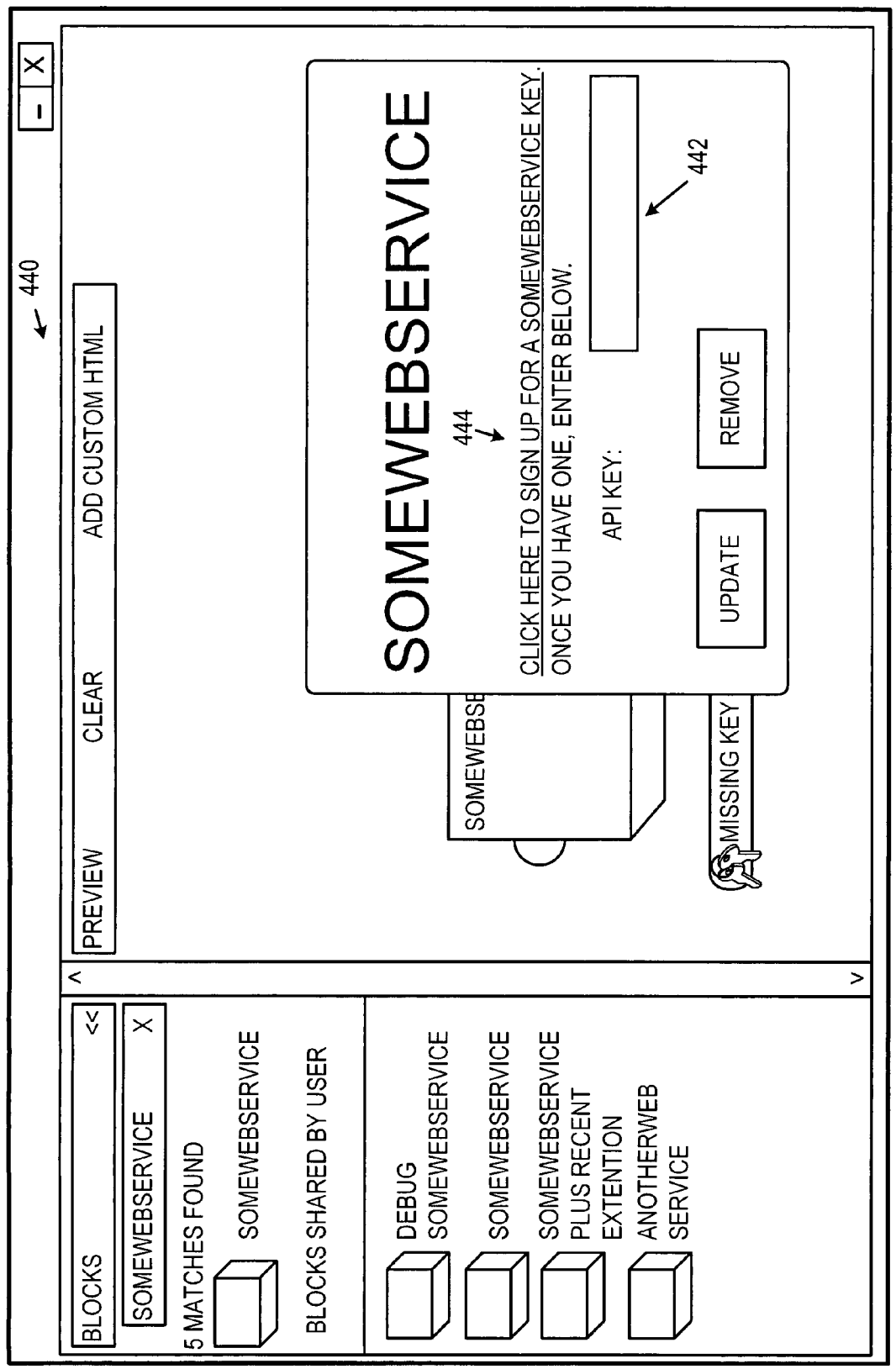
FIG. 10 is a simulated screen for one implementation that illustrates a system notification that a web service key is missing.

FIG. 10 shows a simulated screen 440 of one implementation that illustrates prompting a user for a web service key in a development environment. When the system determines that a developer is working with a project for which he does not have a key, such as at design time or at runtime, a screen similar to FIG. 10 can be shown to prompt the developer to obtain and enter a key in the key input area 442. This screen can be used instead of or in addition to the screen shown in FIG. 9. Information contained in a manifest file, such as one shown in FIG. 11, can be used to facilitate the process of allowing this developer to obtain an original web service key for the web service from directly within the software development environment. For example, using information in the manifest file, the development environment can allow the user to click on the hyperlink 444 to be taken to the signup page for the web service developer key. When the user has completed signup, they can then enter the original web service key that they were provided by the provider of the web service into the key input area 442 for the existing application that uses that web service.

A screen such as FIG. 10 will most commonly be used when one developer has originally created an application and enabled the application for sharing, and then another developer copies the application. Since the first developer's web service key is not stored in the source code, the system determines that the second developer does not have a web service key yet, and provides the key input area 442 shown in FIG. 10.

Turning now to FIG. 11, an exemplary manifest file is shown. The manifest shown includes details about a particular web service, such as the location of the web service, the methods offered by the web service, the parameters accepted by each method, and so on. As noted previously in the discussion of FIG. 9, a manifest file such as the one shown in FIG. 11 can be used to facilitate the process of allowing a developer to obtain an original web service key for a given web service from directly within the software development environment.

Figure 12:
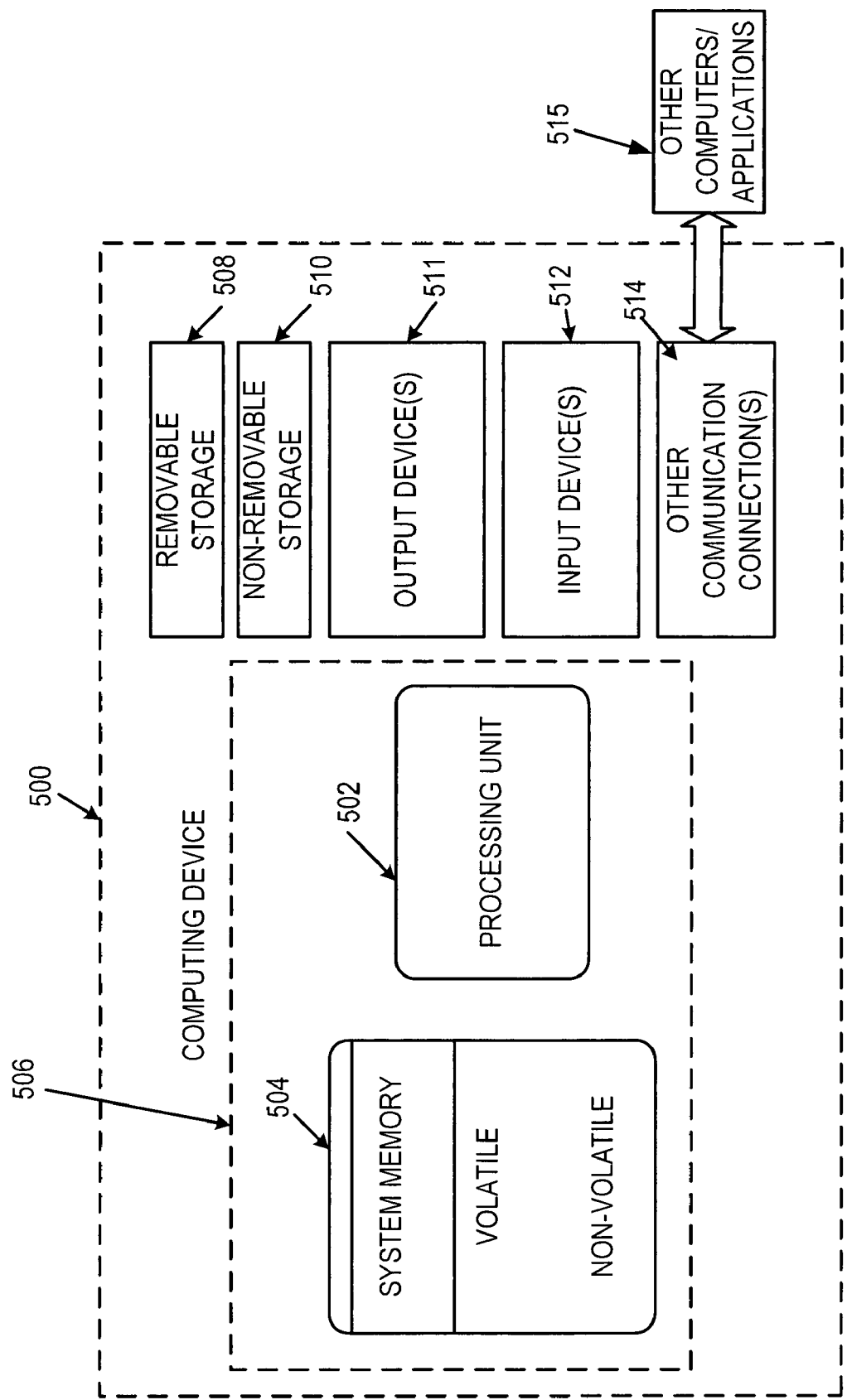
FIG. 12 is a diagrammatic view of a computer system of one implementation.

As shown in FIG. 12, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 12 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 12 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here. In other implementations, one or more computing devices 500 perform some or all of the other techniques described herein, such as those performed by key management application (20 on FIG. 1, and 200 on FIG. 2), web server (14 on FIG. 1), client device (12 on FIG. 1), web services (30 on FIG. 1), and/or secure storage (26 on FIG. 1). These features can be provided on the same or different computers in various combinations as would occur to one of ordinary skill in the computer software art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples. For example, the figures herein that discussed web services, users, and/or computers in the singular or the plural form are not meant to be limiting in nature. In other words, some or all of the techniques described herein could be used with a single web service, with multiple web services, with a single user, and/or with multiple users.

What is claimed is:

1. A computer-readable storage medium, the computer-readable storage medium not consisting of a propagating signal, the computer-readable storage medium having computer-executable instructions for causing a computer to perform steps comprising:

generating a generic key identifier based on an original web service key for a web service, wherein the web service is a function that is called over the Internet, and wherein the generic key identifier is an encrypted version of the original web service key;

saving the original web service key and tracked information regarding an associated intended server in a secure storage device, the original web service key retrievable based on the generic key identifier;

saving the generic key identifier within a source code of an application being developed; and upon receiving a request to run the application, transforming the generic key identifier back into the original web service key prior to calling the web service, wherein the transforming stage is operable to lookup the original web service key in the secure storage device based on the generic key identifier and ensure that the original web service key is only sent to the intended server based on the tracked information.

2. The computer-readable storage medium of claim 1, wherein the generic key identifier is a textual description of the original web service key.

3. The computer-readable storage medium of claim 1, wherein the generic key identifier is placed in the source code of the application when the application is saved.

4. A method for securing and using web service keys in a development environment comprising the steps of:

receiving input from a user to create an application that uses one or more web services that require an original web service key assigned to the user, wherein the web service is a function that is called over the Internet;

saving the original web service key assigned to the user and tracked information regarding an associated intended server in a secure storage device;

transforming the original web service key into an encrypted key;

using the encrypted key within source code for the application;

when receiving a request to run the application, decrypting the encrypted key back into the original web service key; and calling the web service using the original web service key ensuring that the original web service key is only sent to the intended server based on the tracked information.

5. The method of claim 4, wherein the transforming is performed when saving the application.

6. The method of claim 4, wherein the decrypting is performed by a backend web server.

7. The method of claim 4, wherein the decrypting is performed by programmatically generating the original web service key back from the encrypted key.

8. The method of claim 4, wherein the decrypting is performed by accessing the secure storage device to look up the original web service key that corresponds to the encrypted key.

9. The method of claim 4, further comprising:

returning results to a client device after calling the web service.

10. The method of claim 4, wherein the original web service key is only transmitted directly to a provider of the web service.

11. A computer-readable storage medium, the computer-readable storage medium not consisting of a propagating signal, the computer-readable storage medium having computer-executable instructions for causing a computer to perform the steps recited in claim 4.

* * * * *